United States Patent [19]

Ariga

[11] Patent Number: 5,022,687
[45] Date of Patent: Jun. 11, 1991

[54] PIPE COUPLING

[75] Inventor: Toshiki Ariga, Kawasaki, Japan

[73] Assignee: Yokohama Aeroquip Corporation, Tokyo, Japan

[21] Appl. No.: 408,244

[22] Filed: Sep. 18, 1989

[51] Int. Cl.⁵ .............................................. F16L 39/00
[52] U.S. Cl. ...................................... 285/321; 285/347
[58] Field of Search .............. 285/321, 322, 323, 307, 285/347

[56] References Cited

U.S. PATENT DOCUMENTS

| | | | |
|---|---|---|---|
| 1,182,710 | 5/1916 | Rowell | 285/321 X |
| 2,441,344 | 5/1948 | Bosworth | 285/321 |
| 2,848,255 | 8/1958 | Klein et al. | 285/321 X |
| 3,773,360 | 11/1973 | Timbers | 285/307 |
| 4,850,622 | 7/1989 | Suzuki | 285/321 |

FOREIGN PATENT DOCUMENTS

| | | | |
|---|---|---|---|
| 60-127185 | 7/1985 | Japan . | |
| 63-53094 | 4/1988 | Japan . | |
| 63-74593 | 5/1988 | Japan . | |
| 2041476 | 9/1980 | United Kingdom | 285/323 |

*Primary Examiner*—Dave W. Arola
*Attorney, Agent, or Firm*—Fleit, Jacobson, Cohn, Price, Holman & Stern

[57] ABSTRACT

A female coupling member of a pipe coupling is provided with a cap-like retainer removably mounted thereon and having an inner tapered surface. A male coupling member includes a cylindrical portion inserted into an axial bore in the female coupling member and a split elastic cotter ring retained on the cylindrical portion. When the male coupling member is pulled back, the cotter ring is brought into engagement with the tapered surface of the cap-like retainer to couple the coupling members to each other.

2 Claims, 3 Drawing Sheets

PIPE COUPLING

TECHNICAL FIELD

This invention relates to a pipe coupling adapted for use with piping of hydraulic units for various kinds of industrial machines or vehicles wherein female and male coupling members can be quickly connected to each other.

BACKGROUND ART

There has been known heretofore a pipe coupling comprising female and male coupling members threadedly connected to each other (see Japanese Utility Model Public Disclosure Sho No. 60-127185). Such a pipe coupling is of simple structure and is easy to manufacture but it is difficult to use the coupling in a narrow space because the operation of connection of the female and male coupling members to each other cannot be easily performed.

There has also been known a steel ball type of pipe coupling in which a female coupling member is provided with a plurality of tapered holes formed at the inner periphery of a connector portion thereof for receiving steel balls and a male coupling member is provided with a groove formed therein for receiving the balls projected from their retracted position in the holes when the male coupling member is inserted into the connector portion of the female coupling member. A special machine is required to machine the tapered holes in the female coupling member and this will make the coupling more expensive. In addition, the groove in the male coupling member is liable to be deformed due to excessive local stress resulting from point-contacts between the steel balls and the groove. This results in a short life of the pipe coupling.

SUMMARY OF INVENTION

A main object of the invention is to provide a pipe coupling which is simple in structure and easy to manufacture.

Another object of the invention is to provide a pipe coupling comprising female and male coupling members which can be easily quickly coupled to each other and wherein a firmer connection between the female and male coupling members can be achieved by subjecting them to internal pressure in the coupling.

These objects of the invention are achieved by providing a pipe coupling comprising a female coupling member including an axial bore extending therethrough, the axial bore having an enlarged bore portion extending axially from the inner end face of the female coupling member and having an inner tapered surface adjacent to the end face, a cap-like retainer removably mounted on the female coupling member and having an inner tapered converging surface and an elastic split cotter ring disposed within a space defined by the inner tapered surface of the cap-like retainer and having an outer tapered surface complementary to a portion of the inner tapered surface of the retainer and a male coupling member including a cylindrical portion complementary to and adapted to fit into the enlarged bore portion of the female coupling member, the cylindrical portion having an enlarged diameter portion, an outer tapered surface on the cylindrical portion of the male coupling member and complementary to the inner tapered surface of the enlarged bore portion for engaging and expanding the cotter ring when the cylindrical portion of the male coupling member is inserted through the cap-like retainer into the enlarged bore portion of the female coupling member, and an annular groove formed in the enlarged diameter portion adjacent the tapered surface for receiving the cotter ring when it rides past the tapered surface, the cotter ring being moved relative to the cap-like retainer so as to bring its tapered surface into tight engagement with the tapered surface of the cap-like retainer when the male coupling member is pulled back.

In the preferred embodiment of the invention, an expansible retaining ring is positioned within the space in the cap-like retainer in a juxtaposed relationship with the cotter ring, upon the insertion of the male coupling member into the female coupling member, the retaining ring is fitted into the groove in the enlarged diameter portion of the male coupling member in the same manner as in the cotter ring and the retaining ring is moved out of the opening of the cap-like member by pulling back the male coupling member to engage the end face of the cap-like member, thereby preventing any axial movement of the male coupling member relative to the female coupling member.

BRIEF DESCRIPTION OF THE DRAWINGS

The above objects and other objects and advantages of the invention will become more apparent from the following descriptions made with reference to the accompanying drawings in which.

DETAILED DESCRIPTION OF THE PREFERRED EMBODIMENTS

Figure 1:
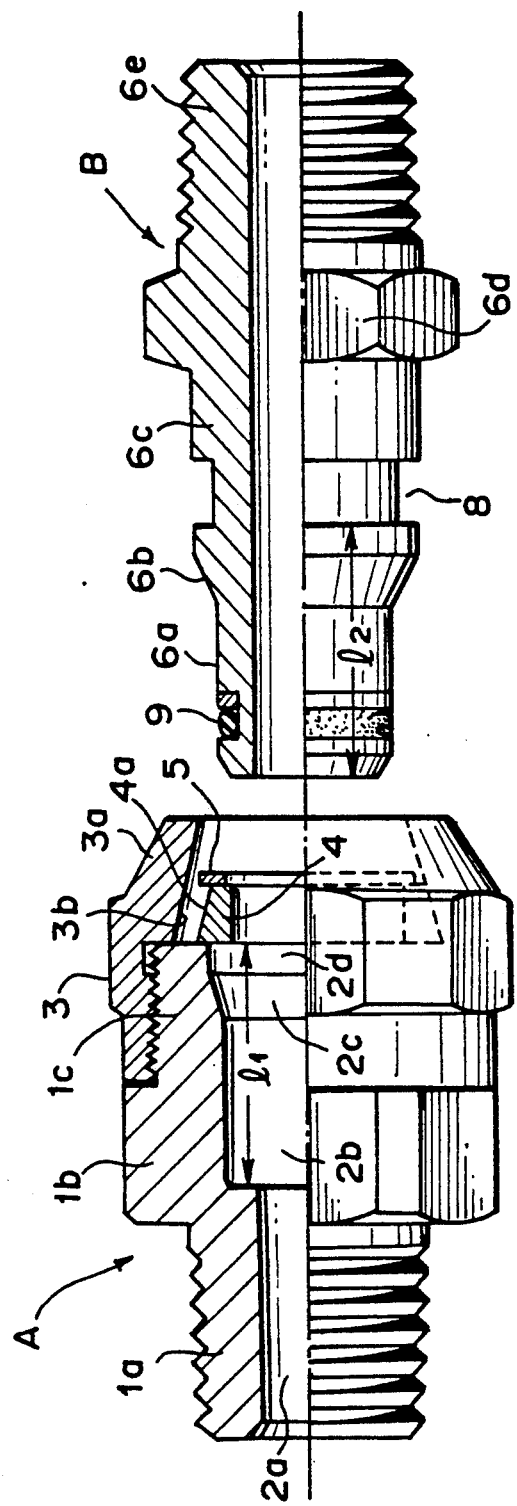
FIG. 1 is a side elevational view of the female and male coupling members of a pipe coupling according to the present invention, the upper halves of the coupling members being shown in section.

Referring to FIG. 1 of the drawings, there is shown a pipe coupling comprising a female coupling member A and a male coupling member B adapted to cooperate with the female coupling member A. The coupling member A includes an externally threaded end portion 1a adapted to be connected to a manifold or piping of an equipment, a polygonal portion 1b which is engaged by a tool for turning the coupling member A, and an externally threaded portion 1c at the inner end of the coupling member A. The female coupling member A also includes a cap-like retainer 3 detachably threadedly connected to the externally threaded portion 1c and has an axial bore 2a extending therethrough and defining a fluid passage. The axial bore 2a has a radially enlarged portion 2b extending axially from the inner end face of the female coupling member A. A cylindrical portion 6a of a male coupling member B as will be described below is arranged to fit into the enlarged bore portion 2b of the female coupling member A. The enlarged bore portion 2b has an inner tapered surface 2c followed by a parallel enlarged surface 2d formed adjacent to the end face of the female coupling member A.

The cap-like retainer 3 has a forward extension 3a defining an opening which is provided with an inner converging tapered surface 3b through which the cylindrical portion 6a of the male coupling member B can be inserted into the enlarged bore portion 2b of the female coupling member A. A substantially C-shaped or split elastic cotter ring 4 and a radially expansible retaining ring 5 are disposed within a space defined by the converging tapered surface 3b of the forward extension 3a, in a juxtaposed relationship. The cotter ring 4 has an axial length which is approximately half the length of the forward extension of the cap-like retainer 3. The cotter ring 4 is provided with a tapered surface 4a formed at the outer periphery thereof, the tapered surface 4a being complementary to and engaging the forward half of the tapered surface 3b of the retainer 3. The retaining ring 5 has its outside diameter substantially equal to that of the cotter ring 4 at its middle.

The male coupling member B has an axial bore extending therethrough and defining a fluid passage in axial alignment with the fluid passage 2a in the female coupling member A. The male coupling member B is also provided with an o-ring 9 engaging in an annular groove which is formed in the cylindrical portion 6a of the coupling member B at the forward end, the o-ring 9 serving to form a seal between the female and male coupling members when the cylindrical portion 6a is inserted in the enlarged bore portion 2b of the female coupling member A. The cylindrical portion 6a of the male coupling member B has an outer tapered surface 6b and an enlarged diameter portion 6c complementary to the inner tapered surface 2c and the enlarged surface 2d of the enlarged bore portion 2b, respectively. An annular groove 8 is formed in the enlarged diameter portion 6c at its outer periphery at a distance 12 from the forward end face of the male coupling member B, which is substantially equal to a distance 11 between the inner end face of the female coupling member A and a shoulder defined by the enlarged bore portion 2b. The width of the groove 8 in the enlarged diameter portion 6c is dimensioned to be equal to the sum of the widths of the cotter 4 and the retaining ring 5. The groove 8 also has its diameter substantially equal to the inside diameter of the cotter ring 4 and its depth smaller than the radial thickness of the cotter ring 4.

The male coupling member B further includes a polygonal grip portion 6d and an externally threaded portion 6e adapted to be connected to piping or hose. The hose may be fixedly secured to the male coupling member B by positioning the hose between a socket (not shown) and the coupling member portion and crimping the socket toward the hose. Although the o-ring 9 has been described as being mounted on the cylindrical portion 2b of the male coupling member B, it may be mounted in the inner surface of the enlarged bore portion 2b of the female coupling member A.

Figure 3A:
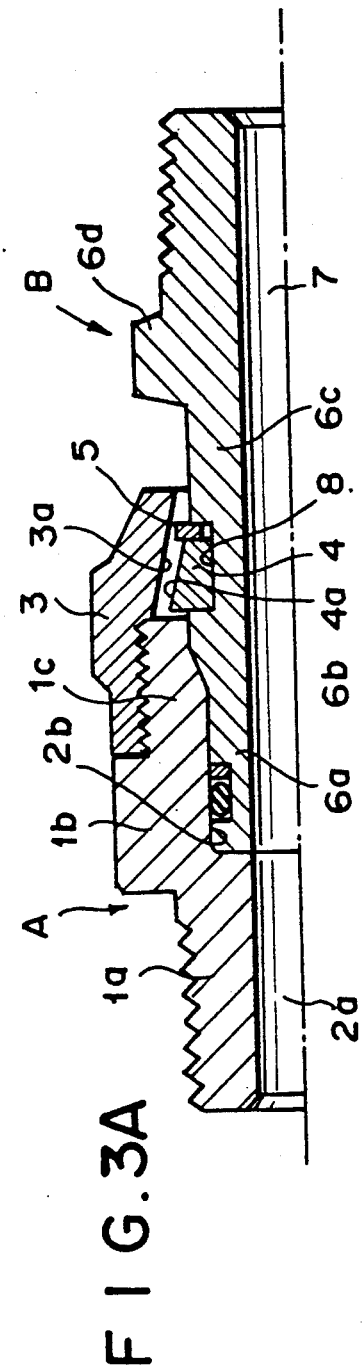
FIG. 3A is a view similar to FIG. 1, but showing the pipe coupling with the male coupling member inserted into the female coupling member.

In operation, the female and male coupling members are coupled to each other by inserting the cylindrical portion 6a through the opening of the cap-like retainer 3 into the enlarged bore portion 2b of the female coupling member A with the grip portion 6b of the male coupling member B griped by a hand. During insertion, the cotter ring 4 and the retaining ring 5 disposed in the cap-like retainer space are fitted over the cylindrical portion 6a and subsequently, expanded radially outwardly by the tapered surface 6b to ride past it. When the forward end face of the male coupling member B abuts the shoulder defined by the enlarged bore portion 2b of the female coupling member A, as shown in FIG. 3A, both the cotter ring 4 and the retaining ring 5 become aligned with the annular groove 8 and due to their constriction, fit into the annular groove 8.

Figure 3B:
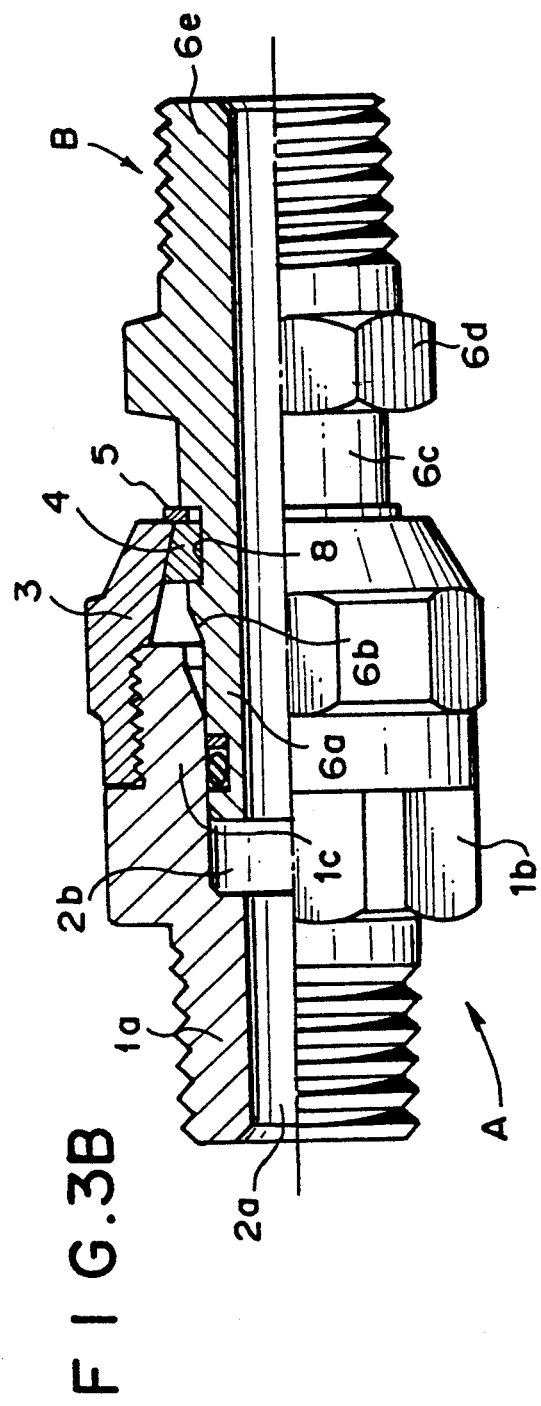
FIG. 3B is a view similar to FIG. 1, but showing the male coupling member pulled back to couple it to the female coupling member.

As the male coupling member B is then pulled back, as shown in FIG. 3B, the cotter ring 4 and the retaining ring 5 are moved relative to the cap-like retainer 3 in the direction of movement of the male coupling member B to bring the outer tapered surface 4a of the cotter ring 4 and the retaining ring 5 into tight engagement with the tapered surface 3b of the retainer 3. With its engagement with the tapered surface 3b of the cap-like retainer 3, the retaining ring 5 is constricted in the retainer extension 3a until it moves out of the opening of the cap-like retainer 3. Thus, the retaining ring 5 expands outside the female coupling member to its original position to engage the end face of the cap-like retainer 3, thereby preventing the male coupling member B from axially moving relative to the female coupling member A.

In use, fluid under pressure exerts force on the end face of the cylindrical portion 6a of the male coupling member B within the enlarged bore portion 2b to wedge the cotter ring 4 onto the tapered surface 3a of the retainer extension 3a, thereby firmly connecting the female and male coupling members A and B to each other.

When it is desired to disconnect the male coupling member B from the female coupling member A, this can be achieved by unscrewing the cap-like retainer 3 from the threaded portion 1c of the female coupling member A and extracting the male coupling member B from the enlarged bore portion 2b of the female coupling member A. During disconnection of the male coupling member B from the female coupling member A, the cap-like retainer 3, cotter ring 4 and retaining ring 5 are retained on the male coupling member B.

When it is desired to remove the cap-like retainer 3 from the male coupling member B in its disconnected position, the cap-like retainer 3 is first moved toward the grip portion 6d of the male coupling member B with the retaining ring 5 constricted within the annular groove 8 and then, a tool such as a driver is used to expand the cotter ring 4 and retaining ring 5 for their removal from the annular groove 8. When it is desired to connect again the female and male coupling members A and B to each other, the cotter ring 4 and retaining ring 5 are incorporated into the space in the retainer extension 3a as shown in FIG. 1.

Figure 2A:
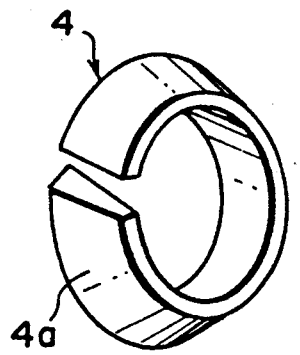
FIG. 2A is a perspective view of a split cotter ring.
Figure 2B:
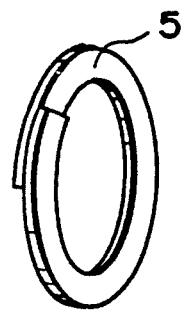
FIG. 2B is a perspective view of an expansible retaining ring.
Figure 4A:
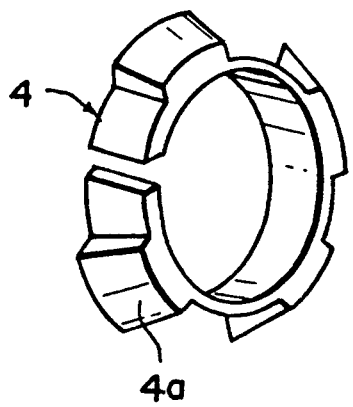
FIG. 4A is a perspective view of a modification of the cotter ring.
Figure 4B:
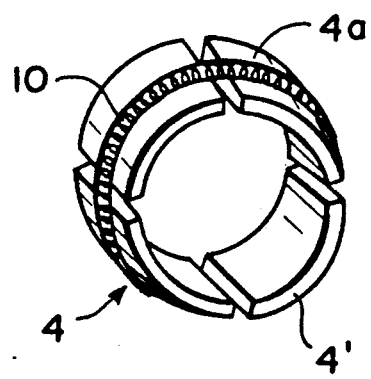
FIG. 4B is a view similar to FIG. 4A, but showing another modification of the cotter ring.

FIG. 4A shows a cotter ring 4 having its circumferentially spaced-apart thick portions with tapered surfaces 4a. It will be appreciated that this cotter ring 4 is equal in function to that shown in FIGS. 1 and 2A. Alternatively, the cotter ring 4 may comprise a plurality of sectors 4' retained by a ring-like coil spring 10 disposed in grooves in the sectors at their periphery, so that the sectors are expansible in the same manner as in the split cotter ring.

Although the retaining ring 5 has been used to prevent the male coupling member B from moving toward the female coupling member A upon connection, the female and male coupling members can be maintained in their connected position under the internal pressure in the fluid passages in the pipe coupling without employing any retaining ring in case of fluid under high pressure since the internal pressure is exerted on the shoulder of the enlarged bore portion of the female coupling member and the end face of the cylindrical portion of the male coupling member to move the coupling members away from each other.

It will be noted that connection of the female and male coupling member to each other can be quickly achieved by inserting the male coupling member into the female coupling member and then pulling back the male coupling member. During passage of fluid under pressure, the internal pressure in the coupling is exerted on the female and male coupling members so that wedging action will take place between the tapered surfaces of the cotter ring and the cap-like retainer to more firmly connect the coupling members to each other. It will also be noted that the expansible retaining ring serves to prevent any movement of the male coupling member relative to the female coupling member when the coupling is subjected to impact.

What is claimed is:

1. A pipe coupling comprising:
   a female coupling member having an inner end face and including an axial bore extending therethrough, the axial bore having an enlarged bore portion extending axially from the inner end face of the female coupling member and having an inner tapered surface adjacent to the end face,
   a cap-like retainer removably mounted on the female coupling member and having an inner tapered converging surface and an end face,
   an elastic split cotter ring disposed within a space defined by the inner tapered surface of the cap-like retainer and having an outer tapered surface complementary to a portion of the inner tapered surface of the retainer, and
   a male coupling member including a cylindrical portion complementary to and adapted to fit into the enlarged bore portion of the female coupling member, the cylindrical portion having an enlarged diameter portion, an outer tapered surface on the cylindrical portion of the male coupling member and complementary to the inner tapered surface of the enlarged bore portion for engaging and expanding the cotter ring when the cylindrical portion of the male coupling member is inserted through the cap-like retainer into the enlarged bore portion of the female coupling member, and an annular groove having a bottom surface formed in the enlarged diameter portion adjacent the outer tapered surface for receiving the cotter ring when it rides past the outer tapered surface, the cotter ring being moved relative to the cap-like retainer so as to bring its outer tapered surface into tight engagement with the inner tapered surface of the cap-like retainer so that said cotter ring is wedged between said bottom surface of said groove and said inner tapered surface when the male coupling member is pulled back.

2. A pipe coupling as set forth in claim 1, and further comprising an expansible retaining ring positioned within the space in the cap-like retainer in a juxtaposed relationship with the cotter ring, wherein, upon the insertion of the male coupling member into the female coupling member, the retaining ring is fitted into the groove in the enlarged diameter portion of the male coupling member in the same manner as the cotter ring, the combined axial width of said cotter ring and said retainer ring being substantially equal to the axial width of said annular groove, and the retaining ring is moved out of the opening of the cap-like member when pulling back the male coupling member and engages said end face, thereby preventing any axial movement of the male coupling member relative to the female coupling member.

* * * * *